Figure 1:
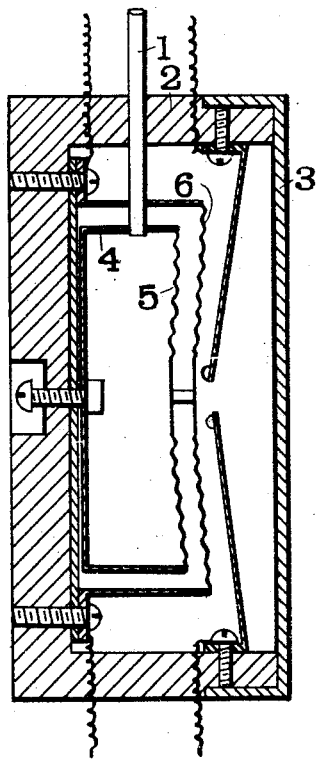

No. 777,046. PATENTED DEC. 6, 1904.
J. P. ROBERTSON.
THERMOSTAT FOR ELECTRIC CIRCUITS.
APPLICATION FILED OCT. 7, 1903.

NO MODEL.

No. 777,046.                                          Patented December 6, 1904.

UNITED STATES PATENT OFFICE.

JAMES PERCIVAL ROBERTSON, OF NORTH SYDNEY, NEAR SYDNEY, NEW SOUTH WALES, AUSTRALIA.

THERMOSTAT FOR ELECTRIC CIRCUITS.

SPECIFICATION forming part of Letters Patent No. 777,046, dated December 6, 1904.

Original application filed August 13, 1902, Serial No. 119,571. Divided and this application filed October 7, 1903. Serial No. 176,052. (No model.)

*To all whom it may concern:*

Be it known that I, JAMES PERCIVAL ROBERTSON, electrician, a subject of the King of Great Britain and Ireland, and a resident of North Sydney, near Sydney, in the State of New South Wales, Commonwealth of Australia, have invented a new and useful Improvement in Thermostats for Electric Circuits, of which the following is a specification.

My invention relates to an improved thermostat for opening or closing an electrical circuit or circuits upon a predetermined rise in temperature occurring in the area governed by the thermostat. It is adapted to positively close or open and keep closed or opened an electrical circuit when the temperature within the area governed by it passes a predetermined point, and that whether or not such temperature varies either way once the predetermined point has been attained. It has been designed, furthermore, to act responsively to a rise in temperature in a chamber of considerable proportions, so as at once to respond to any intense local change in such area or to a general change in the temperature of the area as a whole.

My thermostat has been designed primarily for use with fire-alarm apparatus in which it is desirable that a circuit once opened or closed in consequence of an elevation of temperature beyond the predetermined point shall continue open or closed until the alarm apparatus is reinstated by the fire brigade. It has been designed, furthermore, to obviate the necessity of using a considerable number of contacts to obtain complete protection. It operates through a single contact device which serves a whole chamber or series of chambers.

When a thermostat is used which is responsive only to changes of temperature in the immediate locality of the contact-making device, complete protection is not obtained, as a fire may be actually burning in one part of the chamber without affecting a thermostat of such construction set up in another part of it, so that to obtain efficiency quite a number of such thermostats must be used each with its own circuit or subcircuit, the number of separate contacts being thereby increased and corresponding risk of failure involved. My thermostat is distinguished from thermostats of the kind indicated by the fact that the electrical contact is made at a point distant from the place where the variation in temperature occurs. The contact-making portion of the thermostat may therefore be placed outside a building, and the electrical circuit connected therewith may be arranged externally to the building and incased in metal piping, so that neither the contact-maker nor the electrical circuit-wires are in any considerable measure liable to injury by a fire in the building itself, and the disposition of the parts is such that once the thermostat acts the electrical conditions are fixed and the circuits closed or opened thereby are not liable to change if the thermostat-pipe should be destroyed or injured.

The part of my thermostat which is situated within the chamber or building to be protected consists of a tube of small diameter made of any composition of flexible metal not liable to be acted on by the expansive fluid used. The tube is closed at one end and terminates at the other end in a drum-like vessel in which the contact-making mechanism is situated. This contact-making mechanism, which will be hereinafter described, is adapted to be acted upon so as to close or open the contacts, as may be required, by increase of pressure in the tube resulting from the variation of temperature in the atmosphere in which the tube lies. The tube may contain only air under slight pressure at normal temperature, or it may contain a volatile liquid, such as ammonia or alcohol, pure or diluted. When a liquid is used, the tube should be so disposed that the liquid will remain in the pipe, so as to have an air-cushion behind it. The air or liquid is put into the pipe and the pressure raised to the necessary point before the pipe is closed; but a neat adjustment of the pressure can be obtained by pinching the dead end of the tube, so as to diminish the capacity, and therefore increase the pressure on the fluid contained in it. The pipe may be of any length within extreme limits, and a diameter equal to the bore of a tobacco-pipe stem or larger may be used. The pipe is set, preferably, around the walls of the chamber to be controlled by the thermostat and in the case of a living-apartment may be secreted in or behind the molding of a picture-rail or cornice, or it may be embedded in the ceiling. This disposition of the pipe will secure an elevation of pressure in the fluid therein as the result of a general increase in the temperature of the apartment or as the result of the elevation of temperature in a particular portion of the same contiguous to any portion of the tube's length, so that the electrical contacts will be closed or opened equally when there is a general alteration in temperature or an alteration in temperature in one particular part of the apartment only. In the contact-making device a buckling plate is used for closing the circuits. This is broadly a novel feature in thermostats. It has been usual to employ a flexible plate upon which pressure acts to effect a distortion of the plate and bring it into contact with the line-terminals; but in all these circuit-closers the flexible plate eases back as soon as the pressure behind it is relieved. In my contact-maker the plate used is swaged, so that it will occupy a position of rest only when buckled one way or the other. Normally it will be buckled inward. When a sufficient pressure is raised behind it to overcome its natural resistance to distortion, it will suddenly buckle out in the opposite direction and in so doing bring itself into or out of contact with the line-terminals and stay in or out of contact accordingly, even if the thermostat-pipe should be broken or destroyed by fire or accident. It can be returned to its original position only by the attenuation of the pressure behind it, so that the normal atmospheric pressure may drive it back; but when the tube is filled with a fluid adapted to the particular conditions under which the thermostat is to be worked such an attenuation will not be reached, and the buckling plate when once forced outward to make or open the contacts will stay in that position until reinstated by hand. When the plate is required to close circuits, the contact-points are placed external to it, so that upon blowing outward it will come into contact with them. When, on the other hand, it is required to open the circuits in a closed-circuit system, it is made to act on a reversing-bar or the contacts are placed behind it, so that when it blows outward, due to the pressure behind it, it will separate from the contacts, and so open the circuit.

Figure 2:
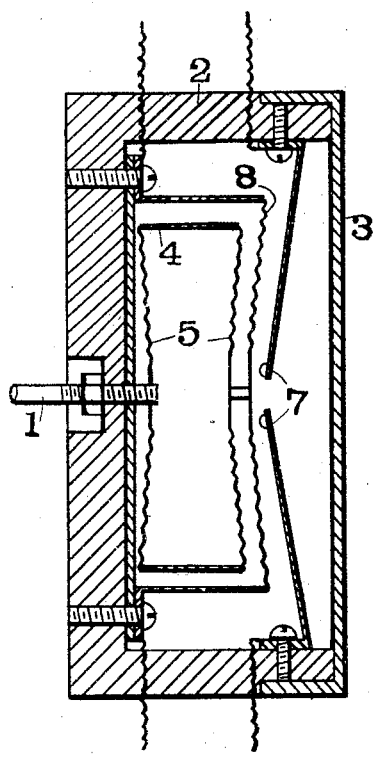

Referring to the accompanying drawings, Figure 1 represents my apparatus in vertical section with the fluid-pipe led into the side of a drum-like chamber of which the buckling plate forms the front end; Fig. 2, a similar view showing the fluid-pipe brought into the back end of such a chamber.

In the drawings, 1 represents the fluid-pipe, whose length is carried round the cornice or picture-rail of an apartment or is otherwise disposed therein.

2 is the casing of the contact-maker; 3, cover for the casing; 4, a drum-like vessel mounted in the casing with the pipe end led into the side of it; 5, a buckling plate forming one end of this drum-like chamber and adapted to be acted upon by the pressure within the pipe 1; 6, an additional buckling plate, which may or may not be used.

In the arrangement shown in Fig. 2 the pipe 1 is led into the back head of the drum-like chamber 4 and both heads of the same are formed of buckling plates 5. In this case also an exterior buckling plate 8, through which the contacts are closed, is shown; but it is not essential, as the electrical connection may be made, as in the previous case, directly between the drum itself and the electrical contact-points 7.

The mode of operation is as follows: The pipe 1, being set up, as described, in the apartment to be governed by the thermostat, is charged with an expansible fluid, which for fire-alarm purposes would consist of an aqueous solution of ammonia, the strength of the solution and the volume of the air-cushion in the pipe being proportioned by test so that a pressure will be produced in the pipe system sufficient to act upon the drum-head and blow the same outward when a predetermined elevation of temperature has been attained. When this elevation of temperature is attained, the rigidity of the drum-head 5 is overbalanced by the pressure behind it and the drum-head is forced outward, buckling in the opposite direction. In doing so it either comes directly into contact with one or more electrical contact-points 7 or drives out the intermediate buckling-head 8 to complete the electrical contact with and between these points. The buckled plate or plates retain their blown position until reset by hand, the electrical circuits which they have closed or opened, as the case may be, thereby remaining closed or opened once the thermostat has "blown." The arrangement of contacts shown is for an open-circuit device. Where a closed-circuit device is used, the contact-points 7 are placed behind one or other of the drum-heads 5 or 8, or the drum-heads 5 or 8 are made to act upon a pivoted bar, through whose other end the electrical contacts are closed. In this case the blowing of the thermostat retires the contact end of the pivoted bar, and so opens the circuits. The contact made by the buckling plate with the contact-points is accompanied by a very slight rubbing action, and the motion due to the rapid reversal of the plate is quick. A first-class contact is thus obtained.

What I claim as my invention, and desire to secure by Letters Patent, is—

1. A device for closing or opening an electrical circuit consisting of a flexible normally buckled plate, in combination with a thermostat whose action is to effect the buckling of said plate in the opposite direction upon increase of temperature at any place in the area guarded by it, substantially as described.

2. In a thermostat electrical contact, the feature of a flexible buckling plate independent of the thermostat proper through and by means of which plate the indicating or alarm circuit or circuits are closed or opened, which plate is set so as that these contacts remain normally closed or broken until the plate is acted upon by the thermostat and caused to buckle outward and take an opposite set whereby the circuit is opened or closed and maintained opened or closed independently of the thermostat and until the set of the plate is reversed by hand, substantially as described.

3. A device for closing or opening an electric circuit, consisting of a flexible buckled plate normally out of or in contact with the line-terminal but remaining in or out of contact therewith respectively when buckled in the reverse direction, in combination with a thermostat whose action is to effect said buckling upon increase of temperature.

4. In a thermostat-contact, the feature of a flexible buckling plate independent of the thermostat, through and by means of which the indicating or alarm circuit is closed or opened, which plate is set so as that the contact remains normally broken or closed until the plate is acted upon by the thermostat and caused to take an opposite set whereby the circuit is closed or opened and maintained closed or opened respectively independently of the thermostat and until the set of the plate is reversed by hand, substantially as described.

5. In a thermostatic device, the combination with a pipe adapted to contain an expansible fluid, said pipe closed at one end, of a closed vessel connected to the discharge end of said pipe, and having a flexible head normally buckled in one direction, said head adapted upon expansion of such fluid to be buckled in the opposite direction.

6. In a thermostatic device, the combination with a pipe adapted to contain an expansible fluid, said pipe closed at one end, of a closed vessel connected to the discharge end of said pipe, and having a flexible head normally buckled in one direction, said head adapted upon expansion of such fluid to be buckled in the opposite direction, and an electrical contact operated by the movement of such head.

7. In a thermostatic device, the combination with a pipe closed at one end and adapted to contain an expansible fluid, said pipe closed at one end, of a closed vessel connected with the opposite end of said pipe and having a flexible head normally buckled in one direction and adapted upon expansion of said fluid to be buckled in the opposite direction, a casing surrounding said chamber and having a flexible wall connected to such buckled head and adapted to move therewith, and operating means controlled by the movement of said flexible wall.

8. In a thermostatic device, the combination with a pipe closed at one end and adapted to contain an expansible fluid, said pipe closed at one end, of a closed vessel connected with the opposite end of said pipe and having a flexible head normally buckled in one direction and adapted upon expansion of said fluid to be buckled in the opposite direction, a casing surrounding said chamber and having a flexible wall connected to such buckled head and adapted to move therewith, and an electrical contact operated by the movement of said movable wall.

9. In a thermostatic device, the combination of the thermostat-tube, the closed vessel connected therewith having a flexible head normally buckled in one direction and adapted upon expansion of fluid in said tube to be buckled in the opposite direction, and means operated by outward movement of such head.

10. In a thermostatic device, the combination of the thermostat-tube, the closed vessel connected therewith having a flexible head normally buckled in one direction, adapted upon expansion of fluid in said tube to be buckled in the opposite direction, the casing surrounding said chamber and having a flexible wall connected to such buckled head and adapted to move therewith, and means operated by outward movement of such head.

In testimony whereof I have hereunto set my hand in presence of two subscribing witnesses.

JAMES PERCIVAL ROBERTSON.

Witnesses:
C. G. HEPBURN,
W. J. DAVIS.